(12) United States Patent
Buckley

(10) Patent No.: US 11,592,535 B2
(45) Date of Patent: Feb. 28, 2023

(54) METHODS AND APPARATUS FOR REPETITIVE HISTOGRAMMING

(71) Applicant: SEMICONDUCTOR COMPONENTS INDUSTRIES, LLC, Phoenix, AZ (US)

(72) Inventor: Steven John Buckley, Henlow (GB)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 478 days.

(21) Appl. No.: 16/794,540

(22) Filed: Feb. 19, 2020

(65) Prior Publication Data

US 2021/0255285 A1 Aug. 19, 2021

(51) Int. Cl.
*G01S 17/10* (2020.01)
*G01S 7/4861* (2020.01)
*G04F 10/00* (2006.01)

(52) U.S. Cl.
CPC ............ *G01S 7/4861* (2013.01); *G01S 17/10* (2013.01); *G04F 10/005* (2013.01)

(58) Field of Classification Search
CPC ....... G01S 7/4861; G01S 17/10; G04F 10/005

USPC ......................................................... 702/180
See application file for complete search history.

(56) References Cited

PUBLICATIONS

Neale A. W. Dutton et al., A Time-correlated Single-photon-counting Sensor with 14GS/s Histogramming Time-to-Digital Converter, 2015 IEEE International Solid-State Circuits Conference, Feb. 24, 2015, Sensors And Imagers for Life Sciences.
Neale Dutton et al., Multiple-Event Direct to Histogram TDC in 65nm FPGA Technology, 2014 10th Conference on Ph. D. Research in Microelectronics and Electronics, 2014.
Ion Vornicu et al., Compact Real-Time Inter-Frame Histogram Builder for 15-Bits High-Speed ToF-Imagers Based on Single-Photon Detection, IEEE Sensors Journal, vol. 19, No. 6, pp. 2181-2190, Mar. 15, 2019.

*Primary Examiner* — Nguyen T Truong
(74) *Attorney, Agent, or Firm* — Treyz Law Group, P.C.; Joseph F. Guihan

(57) ABSTRACT

Various embodiments of the present technology may provide methods and apparatus for repetitive histogramming. The apparatus may provide a limited number of physical bins to perform multiple histograms on a total number of virtual bins. The apparatus may provide a single physical bin that is used to sweep over the total number of virtual bins.

20 Claims, 6 Drawing Sheets

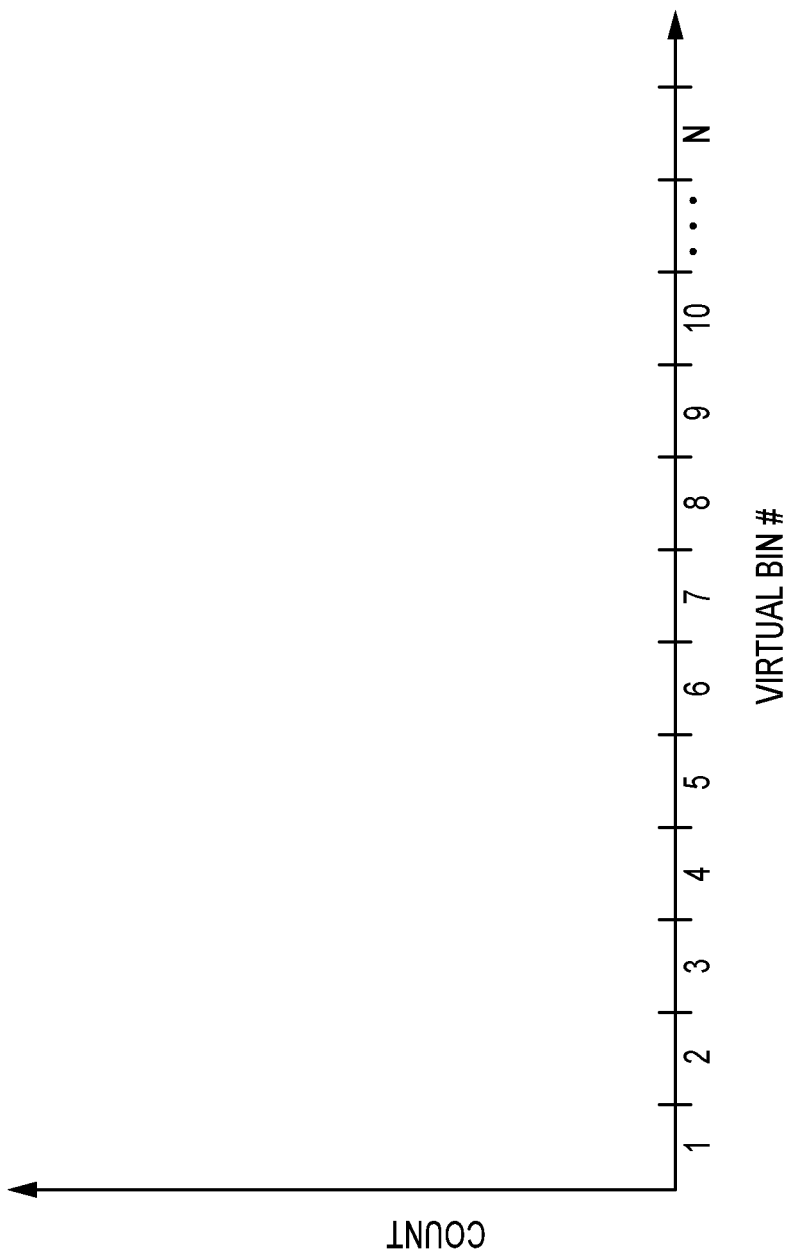

METHODS AND APPARATUS FOR REPETITIVE HISTOGRAMMING

BACKGROUND OF THE TECHNOLOGY

Active ranging systems, such as a LiDAR system, often create a histogram in memory based on time events of an optical detector (e.g., a single-photon avalanche diode (SPAD) array of 640×480 pixels). The peak of the histogram is used to determine the travel time of a transmitted laser signal to return to the optical detector from the initial transmission. The amount of memory required to create the histogram may increase the chip to an impractical size.

SUMMARY OF THE INVENTION

Various embodiments of the present technology may provide methods and apparatus for repetitive histogramming. The apparatus may provide a limited number of physical bins to perform multiple histograms on a total number of virtual bins. The apparatus may provide a single physical bin that is used to sweep over the total number of virtual bins.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various logic gates, latches, counters, state machines, memory, and the like, which may carry out a variety of functions. In addition, the present technology may be integrated in any number of electronic systems, such as automotive, aviation, surveillance, "smart devices," and consumer electronics, and the systems described are merely exemplary applications for the technology.

Figure 1:
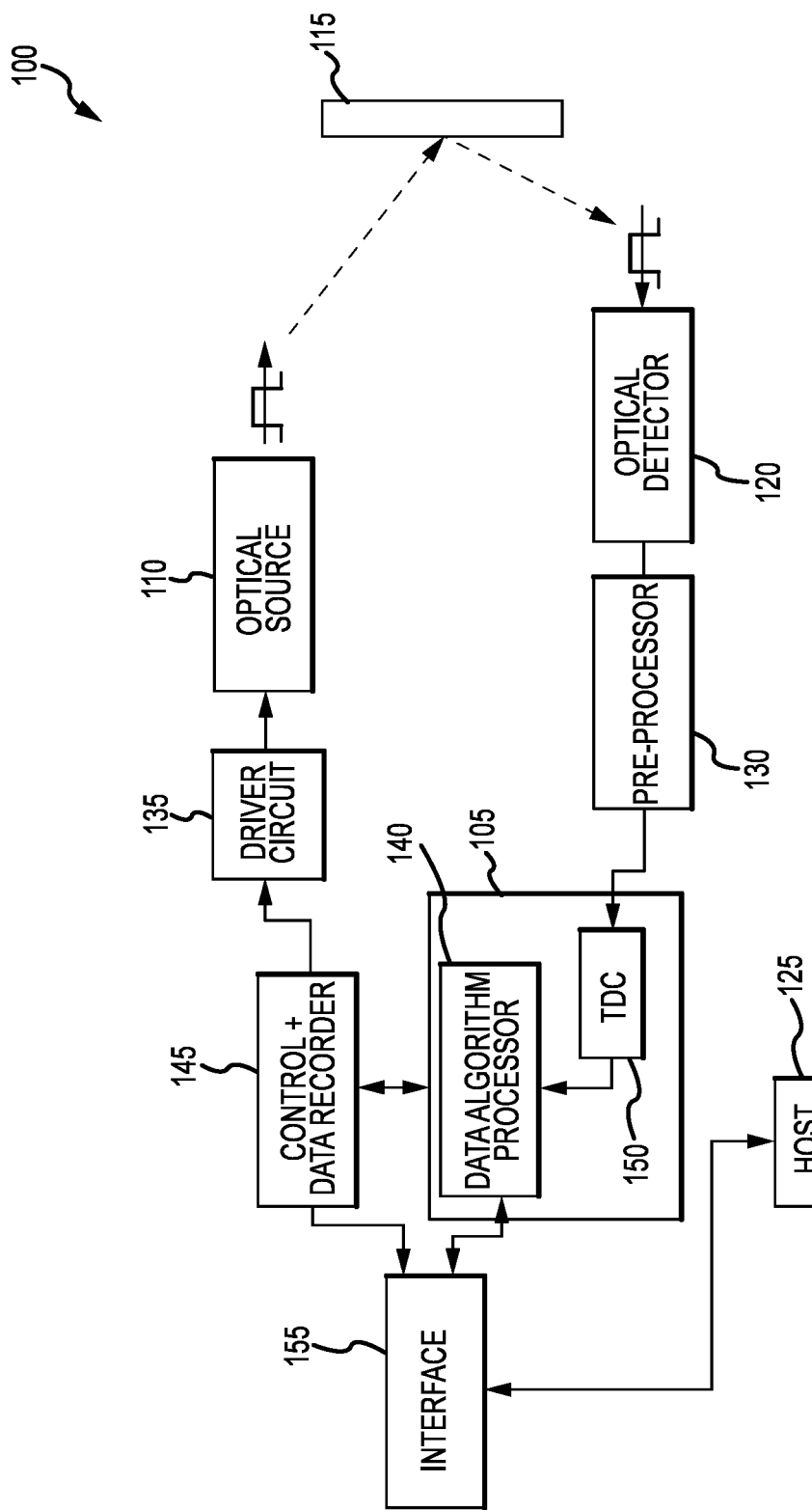
FIG. 1 is a block diagram of a system in accordance with an exemplary embodiment of the present technology.

Referring to FIG. 1, methods and apparatus for repetitive histogramming according to various aspects of the present technology may be integrated in an active ranging sensor system 100, such as such as a light detection and ranging (LiDAR) system, configured to transmit a pulse, detect a reflected pulse, and determine a range to a target based on the time delay between the transmitted pulse to the detected pulse (i.e., the round trip delay) In general, LiDAR systems and other active ranging sensors may measure range to a target 115 by direct time of flight (the round trip delay). In this method, an optical source 110, such as a laser, fires a laser pulse (transmission signal) at the target 115 and a returning photon reflected from the target 115 is detected by an optical detector 120, such as a single photon avalanche diode (SPAD) or silicon photomultipiers (SiPM). A number of SPADs may be arranged in an array, with each SPAD connected to its own dedicated processing circuitry, such as a pre-processor 130 and a processor 105. In other words, the system 100 may comprise a plurality of pre-processors and a plurality of processors, one for each SPAD.

The pre-processor 130 may be configured to receive an input signal from the optical detector 120, amplify the input signal, and/or determine if the input signal exceeds a pre-determined value or accept or reject the input signal based on its characteristics (e.g., amplitude or frequency). For example, the pre-processor 130 may comprise an amplifier (e.g, a high frequency amplifier) and a discriminator circuit. The pre-processor 130 may produce an output signal only if the input signal exceeds the predetermined value and transmit the output signal to the processor 105 for further processing.

The processor 105 may be configured to receive data from the pre-processor, convert the data to time data, build a histogram with the time data, and determine a peak in the histogram. According to an exemplary embodiment, the processor 105 may comprise a time-to-digital converter (TDC) 150 to convert the output signal from the pre-processor 130 to time data. The TDC 150 may comprise a conventional TDC or any other circuit or system suitable for generating a TDC signal that represents a time interval.

According various embodiments, and referring to FIGS. 1, 2, 3, and 6, the processor 105 may further comprise a data algorithm processor 140 that operates in conjunction with the TDC 150. For example, the data algorithm processor 140 may receive the time data from the TDC 150 and perform repetitive histogramming using the time data from the TDC 150. In various embodiments, the data algorithm processor 140 generates (assembles) a histogram having a total number of virtual bins. Each virtual bin of the histogram is defined by a range (time range), and the time data is assigned to a particular virtual bin based on the value of the time data. In various embodiments, the data algorithm processor 140 comprises one or more physical bins (i.e., physical hardware) to histogram one virtual bin at a time or a sub-set of virtual bins at a time.

For example, in a case of a single physical bin, the data algorithm processor 140 may histogram each individual virtual bin sequentially using the single physical bin—e.g., the data algorithm processor 140 may histogram virtual bin number 1 using the single physical bin, then histogram virtual bin number 2 using the same single physical bin, etc., through virtual bin number N.

In a case of multiple physical bins, the data algorithm processor 140 may histogram sequential segments of the virtual bins—e.g., the data algorithm processor 140 may histogram virtual bin numbers 1~4 (a first segment) using four physical bins, then histogram virtual bin numbers 5~8 (a second segment) using the same four physical bins, etc., through virtual bin numbers N−3~N, wherein each segment contains the same number of virtual bins.

Figure 3:
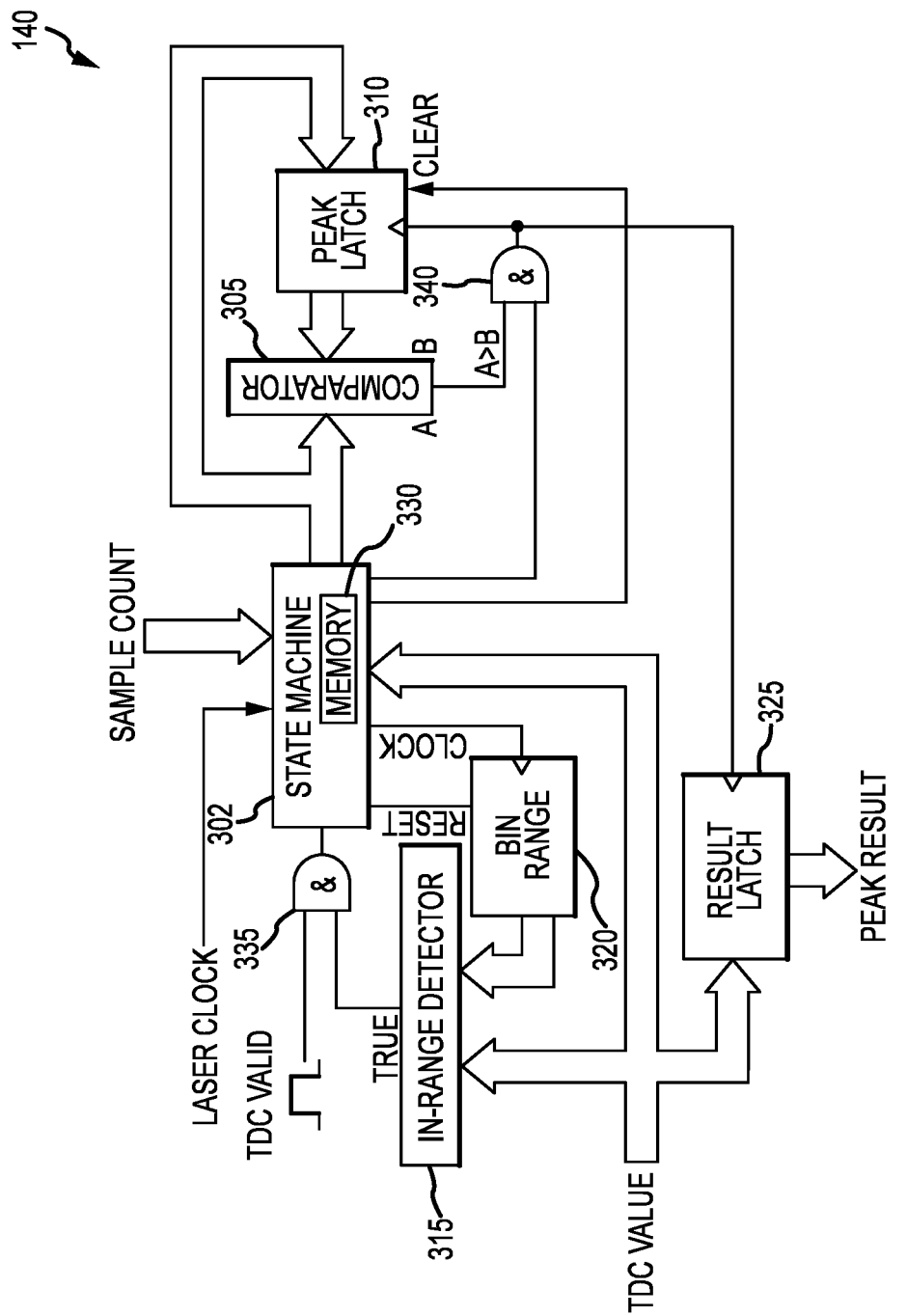
FIG. 3 is a partial block diagram of a processor in accordance with a second embodiment of the present technology.
Figure 4:
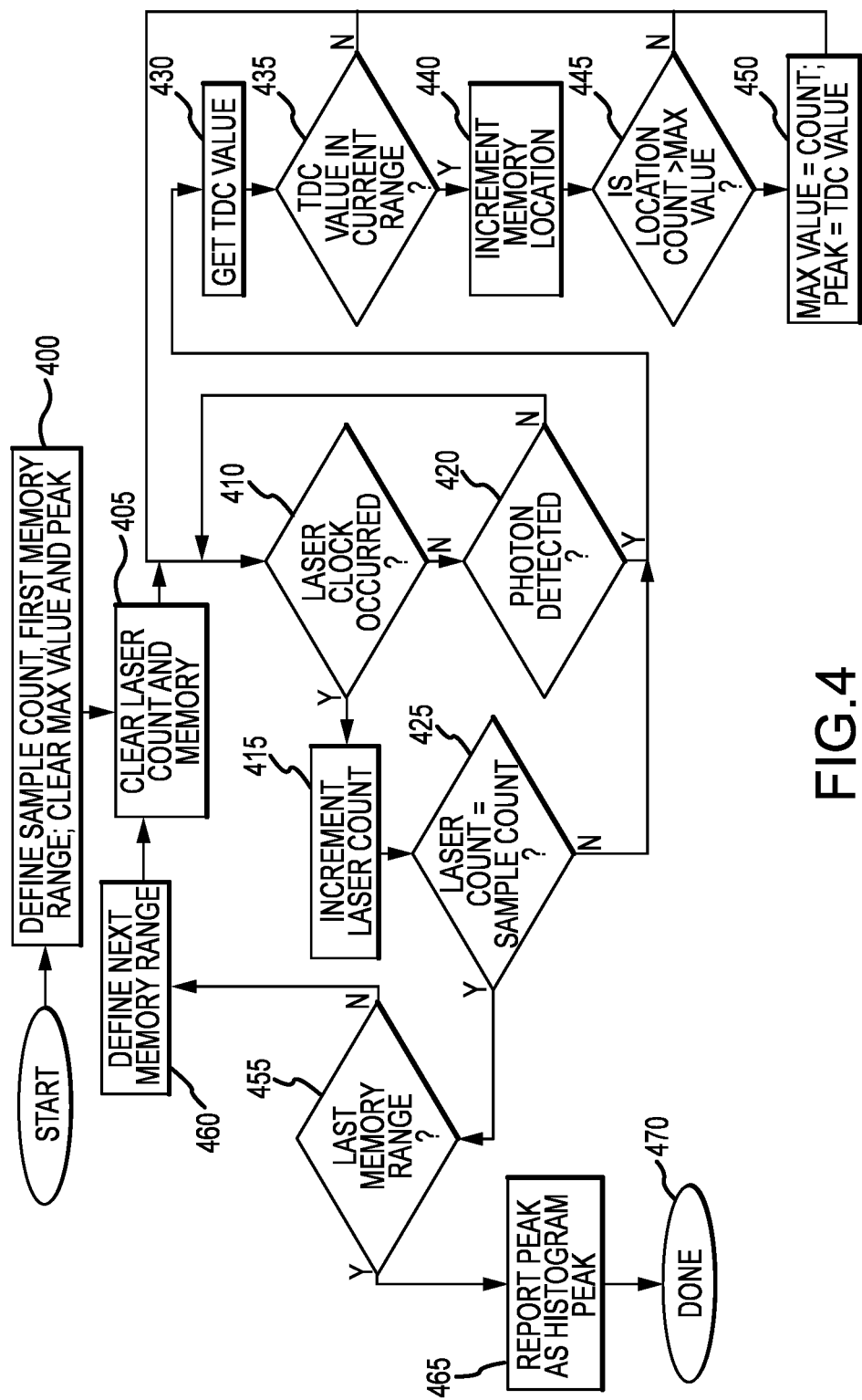
FIG. 4 is a flowchart for repetitive histogramming in accordance with various embodiment of the present technology.
Figure 5:
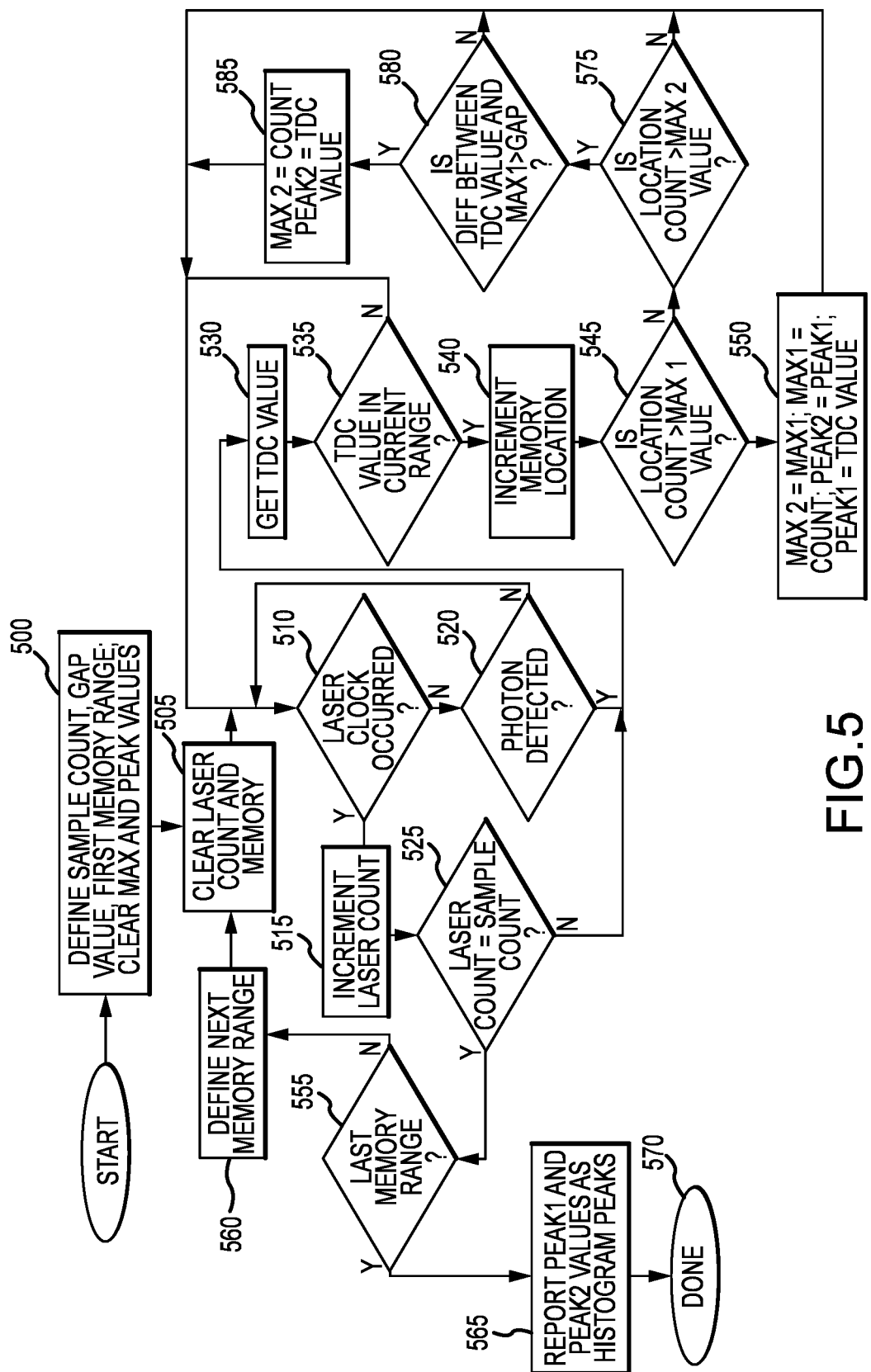
FIG. 5 is an alternative flowchart for repetitive histogramming in accordance with various embodiment of the present technology.

In one embodiment, and referring to FIGS. 1 and 3, the data algorithm processor 140 may comprise a fixed number of physical bins used to histogram a total number of virtual bins in segments, wherein the total number of virtual bins is greater than the number of physical bins.

In the present embodiment, the data algorithm processor 140 may comprise a state machine 302 comprising a memory 330. The memory 330 may comprise a number of memory elements (not shown), wherein each memory element has a unique address and corresponds to a physical bin. The state machine 302 may be configured to receive a TDC value from the TDC 150, a sample count value from the interface 155, and a laser clock signal from the interface 155. The data algorithm processor 140 may further comprise a bin range register 320 configured to receive signals, such as a clock signal and a reset signal, from the state machine 302. The bin range register 320 may be configured to store a range of values for each virtual bin.

The data algorithm processor 140 may further comprise an in-range detector 315 configured to receive a range (of values) from the bin range register 320 and the TDC value from the TDC 150. The in-range detector 315 may be configured to determine if the TDC value falls within the range. The data algorithm processor 140 may further comprise a first AND logic gate 335 to receive a result from the in-range detector 315 and perform an AND function with the TDC valid signal. The first AND logic gate 335 may transmit an output corresponding to the AND function to the state machine 302.

The present embodiment may further comprise a comparator 305 configured to compare data (a first value A) from the state machine 302 to a second value B output from a peak latch 310. The comparator 305 may transmit an output corresponding to the comparison to a second AND logic gate 340. The second logic gate may perform an AND function on the comparator output and a clock signal (having the same frequency as the laser clock signal) from the state machine 320. An output of the comparator 305 may be used to enable the peak latch 310 and a result latch 325. The peak latch 310 may receive data from the state machine 330 and store a data value when enabled. The peak latch 310 may be cleared (reset to zero) via a signal from the state machine 302. The result latch 325 may be configured to receive the TDC value and may store (latches) the TDC value when enabled. The result latch 325 may outputs the latched TDC value as a peak result, wherein the peak result indicates the virtual bin with the highest count value.

Figure 2:
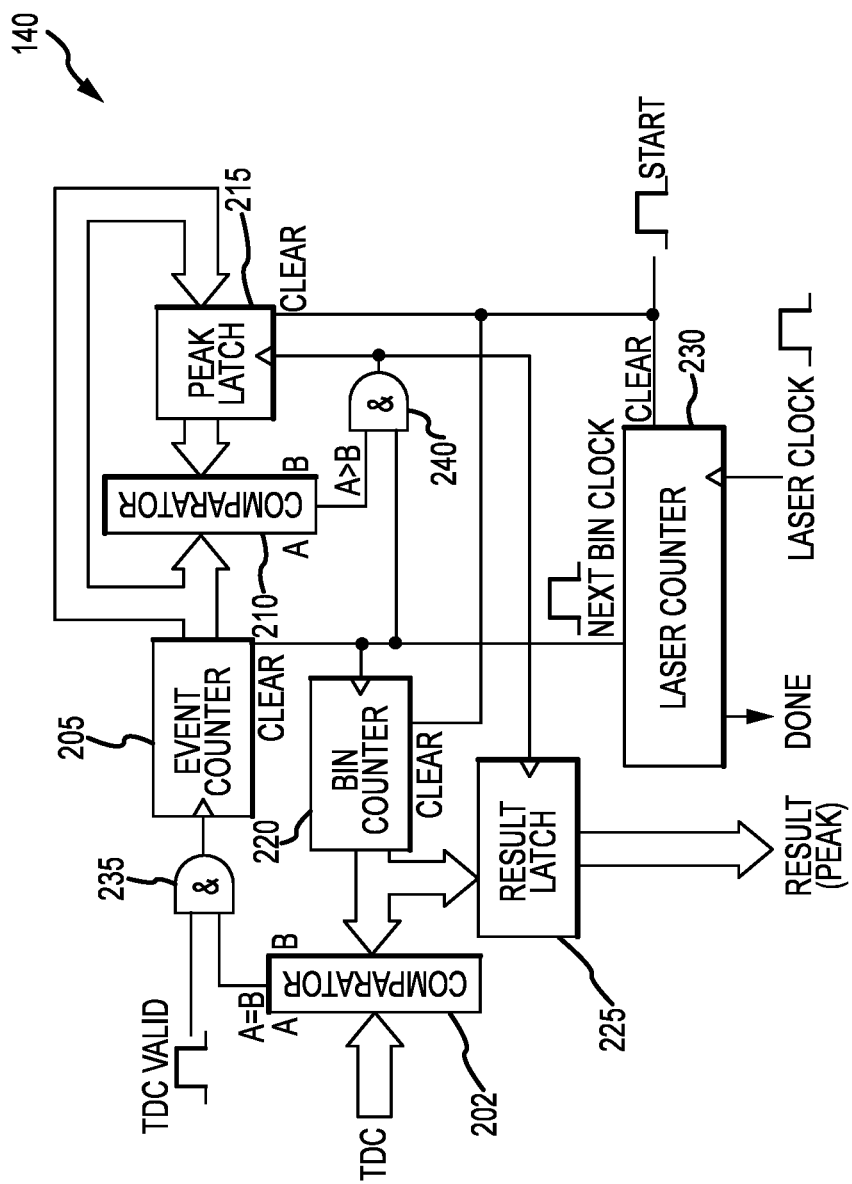
FIG. 2 is a partial block diagram of a processor in accordance with a first embodiment of the present technology.

In an alternative embodiment, and referring to FIGS. 1 and 2, the data algorithm processor 140 may comprise a single physical bin used to histogram a total number of virtual bins, one virtual bin at a time.

In the present embodiment, the data algorithm processor 140 may comprise a first comparator 202 configured to compare a TDC value with a count value from a bin counter. The bin counter 220 may function as the single physical bin. The first comparator 202 may transmit an output corresponding to the comparison to a first AND logic gate 235. The first AND logic gate 235 may perform an AND function on the first comparator output and the TDC valid signal and transmit an output corresponding to the AND function to an event counter 205, wherein the output enables the event counter 205. The event counter 205 may be configured to output an event count value when enabled and transmit the event count value to a second comparator 210 and a peak latch 215. The second comparator 210 may be configured to compare the event count value (A) from the event counter 205 to a value from the peak latch 215 (B) and transmit the second comparator output to a second AND logic gate 240. The second AND logic gate 240 may perform an AND function on the second comparator output and a clock signal from a laser counter 230. The result of the AND function may be used to enable the peak latch 215 and a result latch 225.

The laser counter 230 may be configured to receive the laser clock signal and generate a first signal and a second signal according to the laser clock signal. The laser counter 230 may transmit the first signal to the peak latch 215, wherein the first signal clears (resets the value to zero) the peak latch 215 and starts operation of the TDC 150. The laser counter 230 may also be configured to generate a laser count value according to the laser clock signal. When the laser count value reaches a predetermined value, the laser counter 230 may generate a third signal (DONE) and transmit the third signal to the control and data recorder 145 to indicate the end of the current histogram cycle.

The result latch 225 may be configured to receive the bin count value from the bin counter 220 and may store the bin count value when enabled. The result latch 225 may output a peak result, wherein the peak result represents the virtual bin with the highest count value.

According to various embodiments, the data algorithm processor 140 may be implemented using a field programmable gate array, an application specific integrated circuit, or the like. For example, each comparator, such as the comparators 202, 210, 305 may comprise a conventional comparator circuit implemented using logic gates, transistors, or the like. Each counter, such as the event counter 205, the bin counter 220, and the laser counter 230, may comprise a conventional counter circuit implemented using a number of flip-flops connected in cascade. Each latch, such as the peak latches 215, 310 and result latches 225, 325 may comprise a conventional D-latch circuit with an enable function. The memory 330 may comprise a number of flip-flops or other circuit suitable for storing data.

In an exemplary embodiment, the system 100 may further comprise a control and data recorder 145 configured to receive the peak value (peak result) from the data algorithm processor 145 and pass (relay) the peak value to the host 125 via an interface 155. The control and data recorder 145 may also receive configuration data from the host 125 via the interface 155. The control and data recorder 145 may use the configuration data from the host 125 to drive the driver circuit 135, determine a desired number of laser clocks per cycle, set the sample count value, set a gap value, and the like.

The interface 155 may be configured to relay various data and configuration data to/from various circuits in the system 100 and may comprise a number of I/O terminals to communicate with the processor 105, the control and data recorder, and the host 125. For example, the interface 155 may be configured to receive data from the processor 105, send configuration signals to the processor 105, send data to the host 125, and receive configuration signals from the host 125.

The host 125 may comprise a computer or microprocessor to control peripheral systems, such as an advanced vehicle assist system in an automobile, according to data received from the interface 155 and/or processor 105.

Various embodiments of the present technology may assemble a histogram using data from the TDC 150 comprising repetitively histogramming a number of virtual bins using one or more physical bins and generating an output that represents the virtual bin with the highest count value and the magnitude of the highest count value. Various embodiments of the present technology may also generate outputs that represent the virtual bin with the second-highest count value, the magnitude of the second-highest count value and an average count value for each virtual bin.

According to various operations, and referring to FIGS. 1-6, the system 100 may first define the sample count value and a first memory range (400, 500). The system 100 may also define the gap value (500). The gap value may be a predetermined configuration setting that defines the minimum gap (in bins) between 2 peaks values for them to be regarded as separate peaks and not part of the same peak. The system 100 may also clear (reset to 0) a maximum value(s) and a peak value(s) stored in the control and data recorder 145 (400, 500). The system 100 may then clear (reset) the laser count (the laser counter 220, or the memory 300) and the memory (e.g., the bin counter 220 or the memory 300) (405, 505). The system 100 may then determine if a laser clock occurred (410, 510). If not, then the system 100 may determine if a photon is detected by the optical detector 120 (420, 520). If no photon is detected, then the system 100 determine whether a new laser clock has occurred. If the system 100 determines that a laser clock did occur, then the system 100 may increment the laser count (415, 515) For example, the control and data recorder 145 may deliver the laser clock signal to the laser counter 230 or the state machine 302.

The system 100 may then determine if the laser count is equal to the sample count (425, 525). For example, the state machine may compare the laser count and the sample count. If the laser count is equal to the sample count and the data algorithm processor 140 has performed histogramming on the last memory range (455, 555), then the data algorithm processor 140 may generate the result signal and report one or more peak values as the histogram peaks (465, 565). If the last memory range (virtual bin(s)) has not been histogrammed, then the data algorithm processor 140 may define a next memory range (460, 560) and start a new histogramming cycle by clearing the laser count and memory to zero (405, 505). In the case of a single physical bin, the last memory range is the range of the last single virtual bin. In the case of multiple physical bins, the last memory range is the range of the last set of virtual bins.

If a photon is detected (420, 520) or if the laser count is not equal to the sample count (425, 525), then the system 100 may get a digital value from the TDC 150 (430, 530). The system 100 may determine whether the digital value falls within the current range of the virtual bin(s) (435, 535). If the digital value does not fall within the current range, then the system 100 determines whether a new laser clock has occurred (410, 510). If the digital value falls within the current range, then the system 100 may increment the count value of the physical bin (memory location) (440, 540). In a case where only one peak value is reported, the system 100 may determine if the bin count value for the particular physical bin is greater than a maximum value (445). If the bin count value is greater than the maximum value, then the maximum value is set to the bin count value and the peak value is set to the most recent digital value received (450).

In a case where more than one peak value is reported, the system 100 may determine if the bin count value for the particular physical bin is greater than a first maximum value (545). If the bin count value for the particular physical bin is not greater than the first maximum value, then the system 100 may determine whether the bin count value for that physical bin is greater than a second maximum value (575). If the bin count value is greater than a first maximum value, then the second maximum value is set to the first maximum value, the first maximum value is set to the bin count value, a second peak value is set to the first peak value, and the first peak value is set to the most recent digital value received (550). The system 100 may then determine if a difference between the most recent digital value and the first maximum value is greater than the gap value (580).

In various embodiments, the above steps may be performed a number of times such that the system 100 receives a predetermined number of digital values from the TDC 140 for each histogramming cycle.

In the case of a single physical bin (e.g., the bin counter 200), and referring to FIGS. 1 and 2, the data algorithm processor 140 may perform repetitive histogramming using data from the TDC 150 comprising: histogramming a first virtual bin from a total number of virtual bins, comprising: receiving a first plurality of digital values from the TDC; determining whether each digital value, from the first plurality of digital values, falls within a first range of values defined by the first virtual bin; and incrementing a bin count value of a single physical bin for every occurrence that the first digital value falls within the first range (e.g., the data algorithm processor 140 may perform steps 430, 435, 440 as described above).

Repetitive histogramming may further comprise histogramming a second virtual bin from the total number of virtual bins, comprising: receiving a second plurality of digital values from the TDC; determining whether the each digital value, from the second plurality of digital values, falls within a second range of values defined by the second virtual bin; and incrementing the bin count value of the single physical bin for every occurrence that the second digital value falls within the second range (e.g., the data algorithm processor 140 may perform steps 460, 430, 435, 440 as described above).

Repetitive histogramming may further comprise individually histogramming a remaining number of virtual bins from the total number of virtual bins (e.g., the data algorithm processor 140 may perform steps 460, 430, 435, 440 as described above).

The data algorithm processor 140 may reset the bin count value of the single physical bin (e.g., the bin counter 200) to zero between each histogramming cycle (e.g., the data algorithm processor 140 may perform step 405 as described above).

The data algorithm processor 140 may generate a result signal that represents a bin from the total number of virtual bins that has the highest count value and a magnitude of the highest count value (e.g., steps 455, 465 as described above). In various embodiments, the data algorithm processor 140 may transmit the result signal to the control and data recorder 145 and the control and data recorder 145 may transmit the first result to the host 125 via the interface 155.

The data algorithm processor 140 may further generate a number of clock pulses, wherein the number of clock pulses is equal to the total number of virtual bins. Accordingly, at each clock pulse the bin counter 200 may be incremented by 1 to start the next histogramming cycle until histogramming has been performed on all of the virtual bins.

In the case of multiple physical bins (e.g., the memory 330), and referring to FIGS. 1 and 3, the data algorithm processor 140 may perform repetitive histogramming using data from the TDC 150 comprising: histogramming a first set of virtual bins from a total number of virtual bins, comprising: receiving a first plurality of digital values from the TDC; determining whether each digital value, from the first plurality of digital values, falls within a range of values defined by the first set virtual of bins; and incrementing a bin count value of the physical bins (i.e., memory location in the memory 330) for every occurrence that a digital value falls within the range of the respective physical bin (e.g., the data algorithm processor 140 may perform steps 530, 535, 540 as described above).

Repetitive histogramming may further comprise histogramming a second set virtual bins from the total number of virtual bins, comprising: receiving a second plurality of digital values from the TDC; determining whether the each digital value, from the second plurality of digital values, falls within a range of values defined by the second set of virtual bins; and incrementing the bin count value of the physical bins (i.e., the memory location in the memory 330) for every occurrence that a digital value falls within the range of the respective physical bin (e.g., the data algorithm processor 140 may perform steps 530, 535, 540 as described above).

Repetitive histogramming may further comprise histogramming a remaining number of sets of virtual bins from the total number of virtual bins (e.g., the data algorithm processor 140 may perform steps 530, 535, 540 as described above).

The data algorithm processor 140 may reset the count values of the memory locations in the memory 300 to zero between each histogramming cycle (e.g., the data algorithm processor 140 may perform step 505 as described above). In each histogramming cycle, the number of virtual bins is equal to the number of physical bins. For example, if the memory 300 comprises 8 physical memory locations (i.e., physical bins), then the data algorithm processor may histogram 8 virtual bins per histogram cycle.

In the present case, the data algorithm processor 140 may perform a number of histogramming cycles. For example, if the histogram is defined by 2048 virtual bins and the system 100 comprises 8 physical bins, then the data algorithm processor 140 will perform 256 histograms (i.e., 2048 virtual bins/8 physical bins=256 histograms).

The data algorithm processor 140 may generate a first result signal that represents a bin from the total number of virtual bins that has the highest count value and a magnitude of the highest count value (e.g., step 565 as described above). The data algorithm processor 140 may generate a second result signal that represents a bin from the total number of virtual bins that has the second-highest count value and a magnitude of the second-highest count value (e.g., step 565 as described above).

The data algorithm processor 140 may generate a third result signal that represents an average count value for each virtual bin. The average count value represents the average noise level when the data algorithm processor 140 was creating the histogram.

In various embodiments, the data algorithm processor 140 may transmit the first result signal, the second result signal, and the third result signal to the control and data recorder 145 and the control and data recorder 145 may transmit the first result to the host 125 via the interface 155.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A processor, capable of receiving a TDC value from a time-to-digital converter (TDC), comprising:
   a laser counter configured to generate a first signal and a second signal;
   a bin counter configured to generate a first count value that increments in response to the second signal;
   a first comparator configured to receive the TDC value and generate a first comparator output, wherein the first comparator output is based on a comparison of the first count value and the TDC value;
   an event counter configured to generate a second count value that increments in response to the first comparator output;

a peak latch connected to an output terminal of the event counter and configured to store a peak value;
a second comparator configured to generate a second comparator output, wherein the second comparator output is based on a comparison of the second count value and the peak value; and
a result latch configured to output the first count value in response to the second comparator output.

2. The processor according to claim 1, wherein the laser counter is configured to generate a number B of second signals, wherein B is a maximum number of the first count value.

3. The processor according to claim 2, wherein the laser counter is further configured to generate a third signal after B second signals.

4. The processor according to claim 1, wherein the laser counter is configured to generate the second signal every N laser cycles.

5. The processor according to claim 1, wherein the laser counter is responsive to a laser clock signal and generates the second signal according to the laser clock signal.

6. The processor according to claim 1, wherein the result latch outputs the first count value if the second count value is greater than the peak value.

7. The processor according to claim 1, wherein the event counter increments the second count value if the first count value equals the TDC value.

8. The processor according to claim 1, wherein the second signal resets the second count value to zero.

9. The processor according to claim 1, wherein the peak latch receives the second count value and stores the second count value as a new peak value when the second count value is greater than a previous peak value.

10. A method for repetitive histogramming using data from a time-to-digital converter (TDC), comprising:
histogramming a first virtual bin from a total number of virtual bins, comprising:
receiving a first plurality of digital values from the TDC;
determining whether each digital value, from the first plurality of digital values, falls within a first range of values defined by the first virtual bin; and
incrementing a count value of a single physical bin for every occurrence that the first digital value falls within the first range;
resetting the count value of the single physical bin to zero; and
histogramming a second virtual bin from the total number of virtual bins, comprising:
receiving a second plurality of digital values from the TDC;
determining whether the each digital value, from the second plurality of digital values, falls within a second range of values defined by the second virtual bin; and
incrementing the count value of the single physical bin for every occurrence that the second digital value falls within the second range;
individually histogramming a remaining number of virtual bins from the total number of virtual bins.

11. The method according to claim 10, further comprising generating a first result signal that represents a bin from the total number of virtual bins that has the highest count value and a magnitude of the highest count value.

12. The method according to claim 10, further comprising generating a second result signal that represents a bin from the total number of virtual bins that has the second-highest count value and a magnitude of the second-highest count value.

13. The method according to claim 10, further comprising generating a third result signal that represents an average count value for each virtual bin.

14. The method according to claim 10, further comprising generating a number of clock pulses, wherein the number of clock pulses is equal to the total number of virtual bins.

15. A system, comprising:
a source configured to transmit a source signal;
a receiver configured to receive a reflected source signal and generate a reception signal according to the reflected source signal;
a conversion circuit connected to the receiver and configured to convert the reception signal to a digital value that represents time; and
a processor connected to the conversion circuit comprising a total number of physical bins, wherein each physical bin has a unique memory address; and the processor is configured to:
assemble a histogram, having a total number of virtual bins, using the digital value and a total number of physical bins, comprising:
histogramming a first set of virtual bins from the total number of virtual bins, wherein a bin count of the first set of virtual bins is equal to the number of physical bins; and
histogramming a second set of virtual bins from the total number of virtual bins, wherein a bin count of the second set of virtual bins is equal to the number of physical bins and the second set of bins immediately succeeds the first set of bins;
wherein the total number of physical bins is less than the total number of virtual bins.

16. The system according to claim 15, wherein the source comprises a laser, the receiver comprises a single-photon avalanche diode array, and the conversion circuit comprises a time-to-digital converter.

17. The system according to claim 15, wherein the processor is further configured to generate a result signal that represents a bin from the total number of virtual bins that has the highest count value.

18. The system according to claim 15, wherein each physical bin comprises a plurality of D-type flip-flops.

19. The system according to claim 15, wherein assembling the histogram comprises histogramming a total number of sets of virtual bins, wherein the total number of sets of virtual bins is equal to the total number of virtual bins divided by the total number physical bins.

20. The system according to claim 15, wherein the processor is further configured to:
verifying that the digital value falls within a first range of values defined by the first set of virtual bins; and
incrementing a count value of a bin from the total number of physical bins.

* * * * *